US012071861B1

(12) United States Patent
Wood et al.

(10) Patent No.: US 12,071,861 B1
(45) Date of Patent: Aug. 27, 2024

(54) MULTI-PIECE RADIAL TURBINE ROTOR

(71) Applicant: Rolls-Royce North American Technologies Inc., Indianapolis, IN (US)

(72) Inventors: Michael D. Wood, Indianapolis, IN (US); Matthew T. Kush, Indianapolis, IN (US); Timothy P. Fuesting, Indianapolis, IN (US); Douglas D. Dierksmeier, Indianapolis, IN (US)

(73) Assignee: Rolls-Royce American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/371,857

(22) Filed: Sep. 22, 2023

(51) Int. Cl.

| | |
|---|---|
| ***F01D 5/04*** | (2006.01) |
| ***F01D 5/18*** | (2006.01) |
| ***F01D 5/28*** | (2006.01) |

(52) U.S. Cl.
CPC ............ *F01D 5/048* (2013.01); *F01D 5/046* (2013.01); *F01D 5/187* (2013.01); *F01D 5/282* (2013.01); *F01D 5/284* (2013.01); *F05D 2230/237* (2013.01); *F05D 2240/20* (2013.01); *F05D 2300/6033* (2013.01)

(58) Field of Classification Search
CPC . F01D 5/04; F01D 5/043; F01D 5/048; F01D 5/046
See application file for complete search history.

(56) References Cited

U.S. PATENT DOCUMENTS

| | | | | |
|---|---|---|---|---|
| 2,848,190 | A * | 8/1958 | Barr | F01D 5/048 416/185 |
| 2,944,326 | A * | 7/1960 | Stadthaus | F01D 5/3023 29/889.22 |
| 5,263,823 | A * | 11/1993 | Cabaret | F01D 11/006 416/220 R |
| 9,476,305 | B2 | 10/2016 | Jan | |
| 9,726,022 | B2 | 8/2017 | Mittendorf | |
| 9,797,255 | B2 * | 10/2017 | Baehmann | F02C 6/12 |
| 9,850,760 | B2 | 12/2017 | Crosatti | |
| 10,036,254 | B2 * | 7/2018 | Smoke | B23P 15/006 |
| 10,280,768 | B2 * | 5/2019 | Freeman | F01D 5/066 |
| 10,934,859 | B2 * | 3/2021 | Freeman | F01D 5/3061 |
| 11,506,060 | B1 | 11/2022 | Kurlak | |
| 2013/0272882 | A1 | 10/2013 | Mittendorf | |
| 2013/0280036 | A1 | 10/2013 | Jan | |
| 2016/0305249 | A1 | 10/2016 | Crosatti | |
| 2017/0254209 | A1 | 9/2017 | Smoke | |
| 2018/0128109 | A1 | 5/2018 | Humes | |

* cited by examiner

*Primary Examiner* — Justin D Seabe
(74) *Attorney, Agent, or Firm* — Barnes & Thornburg LLP

(57) ABSTRACT

A multi-piece radial turbine rotor includes a hub, turbine blades, and a flowpath ring that couples the turbine blades to the hub. Joints between the components of the rotor are adapted for inspection during manufacture to identify potential defects in the joints.

20 Claims, 4 Drawing Sheets

MULTI-PIECE RADIAL TURBINE ROTOR

FIELD OF THE DISCLOSURE

The present disclosure relates generally to radial turbines, and more specifically to radial turbine rotors.

BACKGROUND

Radial turbine rotors are characterized by rotating in response to a flow of working fluid radially inwardly toward the axis of rotation. In many applications, radial turbine rotors can be more efficient than axial turbine rotors that rotate in response to a flow of working fluid primarily parallel to the axis of rotation.

To increase efficiency of radial turbine rotors, it can be beneficial to increase the temperature of the working fluid that interacts with the rotors. However, manufacturing radial turbine rotors from high temperature materials and/or incorporating an active supply of cooling air into radial turbines presents challenges.

SUMMARY

The present disclosure may comprise one or more of the following features and combinations thereof in an effort to address challenges in radial turbine rotor design and manufacture.

A radial turbine rotor may comprise a hub, a plurality of turbine blades, and a flowpath ring. The hub may be arranged around a central axis that defines a radially-innermost surface of the rotor. The plurality of turbine blades may be located circumferentially outward of the hub. Each of the turbine blades may be shaped to include a root portion adjacent to the hub and an airfoil portion spaced radially outward of the hub. The flowpath ring may be formed to include a plurality of apertures that each receive the root portion of an associated one of the plurality of turbine blades. The plurality of apertures may each be sized to block radially outward movement of the associated one of the plurality of turbine blades. The flowpath ring may be coupled radially outward of the hub to the hub. The hub may be sized to block radially inward movement of the plurality of turbine blades relative to the flowpath ring so that the plurality of turbine blades are fixed in place relative to the hub and the flowpath ring.

In some embodiments, each of the plurality of turbine blades may be fixed to the flowpath ring by a blade joint formed between the root portion of each of the plurality of turbine blades and the flowpath ring. The blade joint may be a braze joint. The hub may be fixed to the flowpath ring by a hub joint formed between a radially-outwardly facing surface of the hub and a radially-inwardly facing surface of the flowpath ring.

In some embodiments, the hub joint may be a diffusion bond joint. At least one of the plurality of turbine blades may be formed to include a cooling air passageway therein. The hub may be formed to include at least one cooling air feed channel in fluid communication with the cooling air passageway and configured to carry cooling air from a location radially inward of the plurality of turbine blades.

In some embodiments, the cooling air feed channel may be in fluid communication with the cooling air passageway at one of the plurality of apertures that each receive the root portion of an associated one of the plurality of turbine blades. A radially-outwardly facing surface of the hub may be formed to include the cooling air feed channel, and the cooling air feed channel may extend radially inward from the radially-outwardly facing surface of the hub toward the central axis and axially along the radially-outwardly facing surface. The plurality of turbine blades may comprise ceramic matrix composite materials.

According to another aspect of the present disclosure, a radial turbine rotor may comprise a hub, a turbine blade, and a flowpath ring. The hub may be arranged around a central axis. The turbine blade may be located radially outward of the hub and may extend into a gas path. The turbine blade may be shaped to include a root portion and an airfoil portion extending outwardly from the root portion into the gas path. The flowpath ring may be formed to include a plurality of apertures extending radially through the flowpath ring. The root portion of the turbine blade may be received by one of the plurality of apertures. The flowpath ring may be coupled radially outward of the hub.

In some embodiments, each of the plurality of apertures may have an inlet opening formed on a radially-inwardly facing surface of the flowpath ring and an outlet opening formed on a radially-outwardly facing surface of the flowpath ring. The inlet opening may have a first width and the outlet opening may have a second width. The first width may be greater than the second width so that radially outward movement of the turbine blade received by the one of the plurality of apertures is blocked by the one of the plurality of apertures and radially inward movement of the turbine blade is blocked by the hub.

In some embodiments, the turbine blade may be fixed to the flowpath ring by a blade joint formed between the root portion of the turbine blade and the flowpath ring. The blade joint may be a braze joint. The hub may be fixed to the flowpath ring by a hub joint formed between a radially-outwardly facing surface of the hub and the radially-inwardly facing surface of the flowpath ring.

In some embodiments, the hub joint may be a diffusion bond joint. The turbine blade may be formed to include a cooling air passageway therein. The hub may be formed to include at least one cooling air feed channel in fluid communication with the cooling air passageway and configured to carry cooling air from a location radially inward of the turbine blade.

In some embodiments, the at least one cooling air feed channel may be in fluid communication with the cooling air passageway at the one of the plurality of apertures that receive the root portion of the turbine blade. A radially-outwardly facing surface of the hub may be formed to include the at least one cooling air feed channel. The at least one cooling air feed channel may extend radially inward from the radially-outwardly facing surface of the hub toward the central axis and axially along the radially-outwardly facing surface. The turbine blade may comprise ceramic matrix composite materials.

These and other features of the present disclosure will become more apparent from the following description of the illustrative embodiments.

DETAILED DESCRIPTION OF THE DRAWINGS

Figure 1:
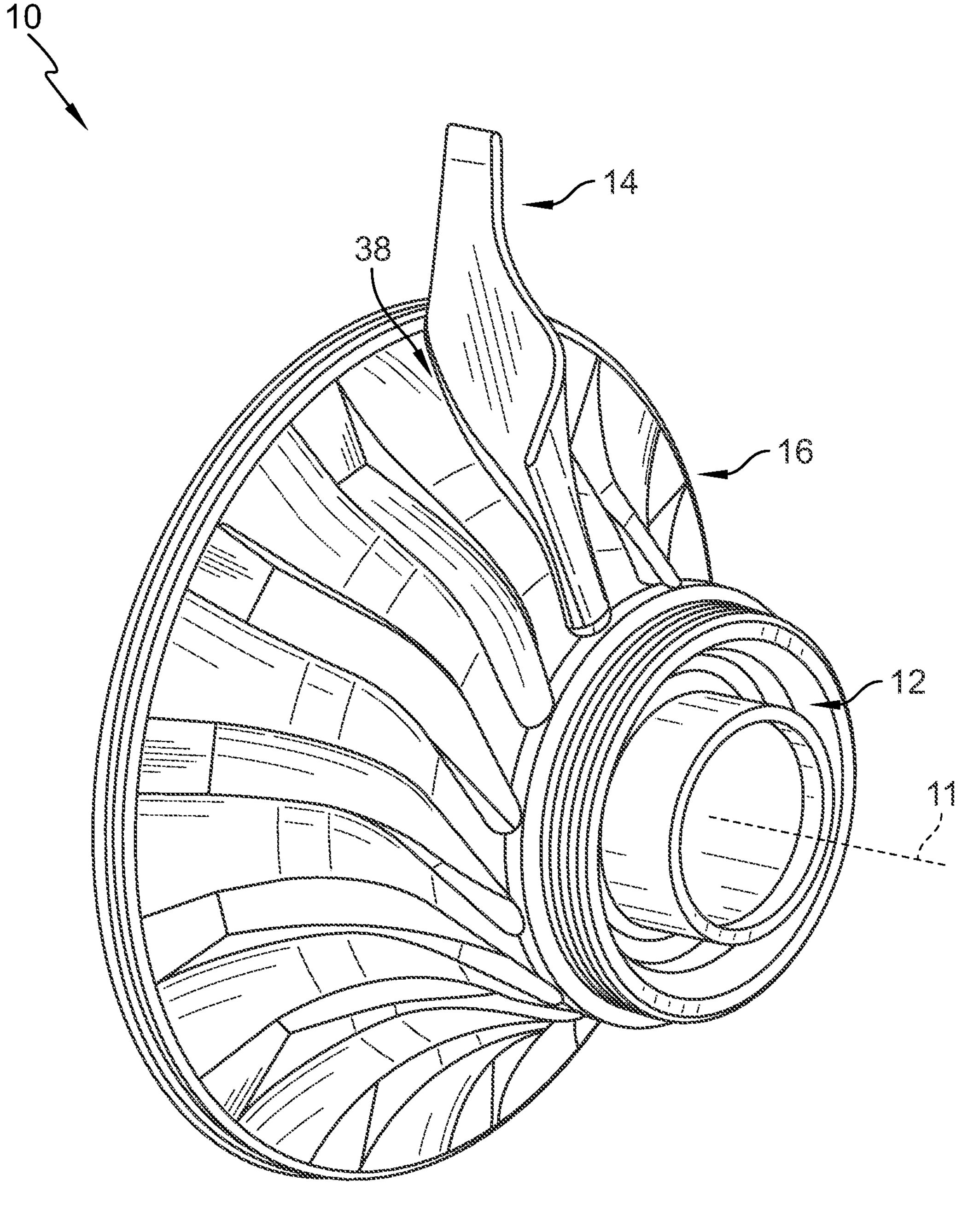
FIG. 1 is a perspective view of a radial turbine rotor assembled from a number of different pieces.

For the purposes of promoting an understanding of the principles of the disclosure, reference will now be made to a number of illustrative embodiments illustrated in the drawings and specific language will be used to describe the same.

A radial turbine rotor 10 for use in a gas turbine engine includes a hub 12, a plurality of turbine blades 14, and a flowpath ring 16 as shown in FIG. 1. The radial turbine rotor 10 extracts energy from a working fluid, such as hot, high pressure combustion products, flowing through a gas path 18. The radial turbine rotor 10 rotates about a central axis 11 to extract mechanical work from the flow of working fluid to drive other components of the gas turbine engine. The flow of working fluid in the radial turbine rotor 10 may be radial to the central axis 11.

Temperatures of the working fluid at an inlet of radial turbines may be relatively high. To allow for relatively high temperatures of the working fluid, cooling of radial turbines, like rotor 10, may be useful so that the materials of the radial turbine can withstand the relatively high temperatures. Conventional manufacturing methods for integrally-cooled turbines utilize integrally cast turbine blades and hub. However, these conventional manufacturing methods may not be cost effective for radial turbines. For example, if one turbine blade of the integrally cast radial turbine has a defect, the entire radial turbine may be unusable. A low casting yield in production due to potential defects may lead to increased costs.

Figure 2:
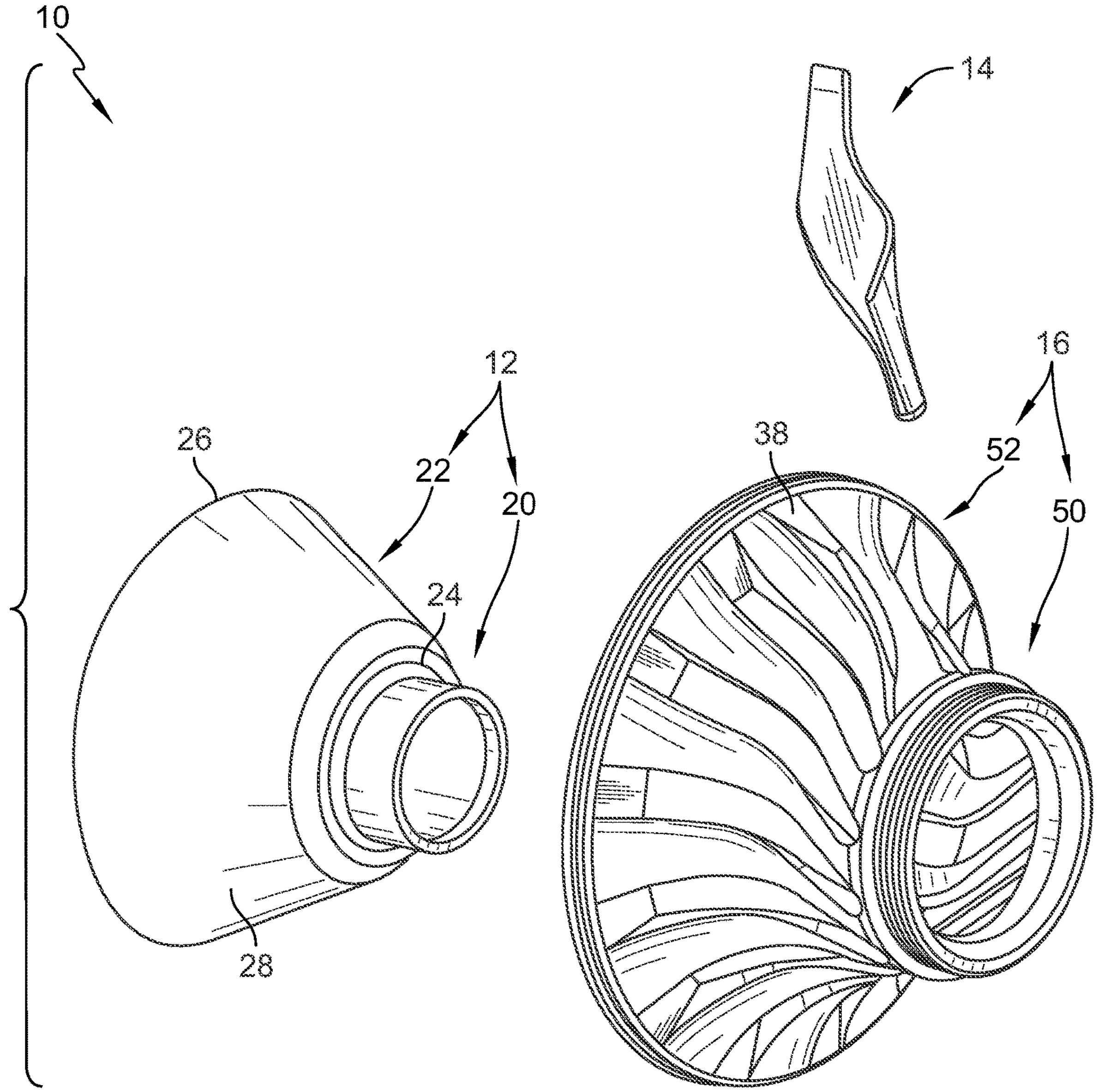
FIG. 2 is an exploded perspective assembly view of the radial turbine rotor from FIG. 1 showing that the rotor includes a hub, a turbine blade, and a flowpath ring formed to include apertures sized to receive a root portion of the turbine blade while an airfoil portion of the turbine blade extends radially outwardly from the flowpath ring, and the flowpath ring shaped to receive the hub inward of the turbine blade to block removal of the turbine blade when the flowpath ring is bonded to the hub.
Figure 3:
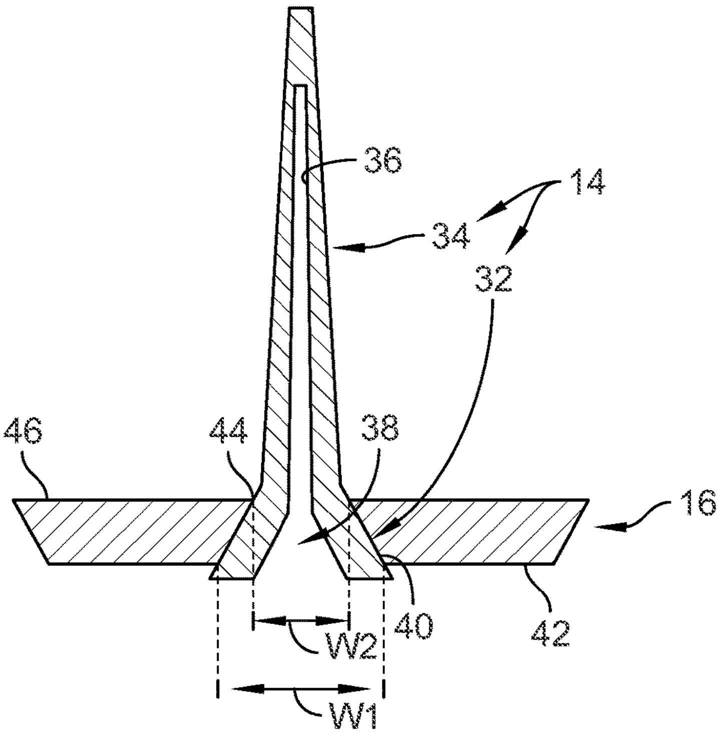
FIG. 3 is a sectional view of a portion of a radial turbine rotor representative of the radial turbine rotor from FIG. 1 showing the turbine blade inserted in a radially-outwardly extending manner through an associated aperture in the flowpath ring illustrating that the root portion of the turbine blade is sized to block motion of the turbine blade all the way through the aperture.

The radial turbine rotor 10 provides passages for cooling without integral manufacture of the rotor 10 from a single piece as suggested in FIGS. 1-3. The radial turbine rotor 10 includes the hub 12, the plurality of turbine blades 14, and the flowpath ring 16, which are separate components that are assembled to form the radial turbine rotor 10 as suggested in FIG. 2. The multi-piece radial turbine rotor 10 allows for inspection of each component prior to assembly of the radial turbine rotor 10 so that the entire radial turbine rotor 10 may not be deemed unusable due to a defect in one component. Each component (i.e., the hub 12, each of the plurality of turbine blades 14, and the flowpath ring 16) may be inspected for defects prior to coupling the components together, and defective components may be discarded.

The hub 12 is arranged around the central axis 11 as shown in FIG. 1. As assembled, the hub 12 defines a radially-innermost surface of the radial turbine rotor 10. In the illustrative embodiment, the hub 12 includes a cylindrical portion 20 and a conical portion 22. The conical portion 22 of the hub 12 extends between a first end 24 and a second end 26. The first end 24 has a first diameter, and the second end 26 has a second diameter. The first diameter is smaller than the second diameter. The first end 24 of the conical portion 22 is coupled with the cylindrical portion 20 of the hub 12.

Figure 4:
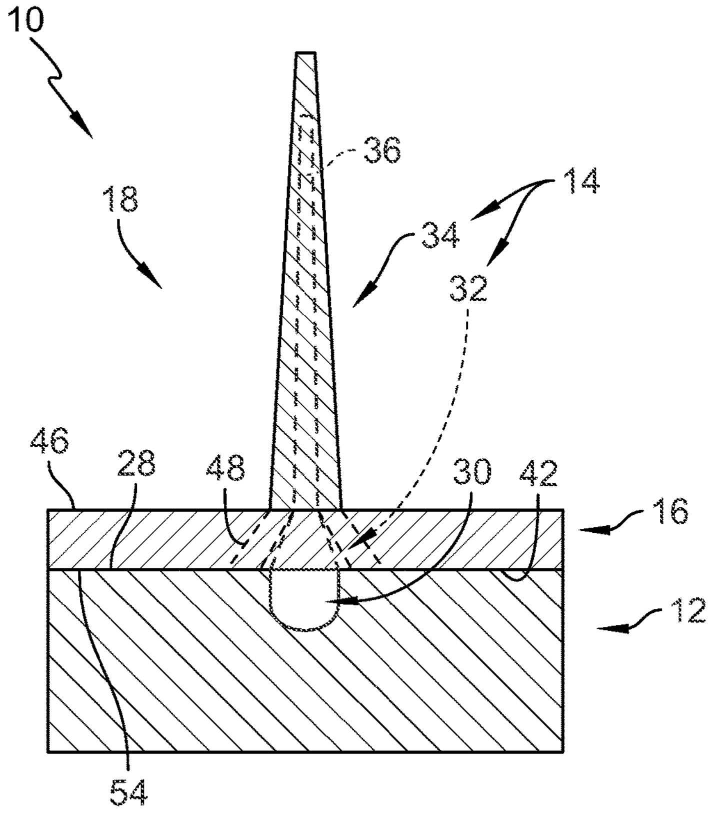
FIG. 4 is a sectional view similar to FIG. 3 showing the hub inserted into the flowpath ring so that the hub blocks radially-inward movement of the turbine blade relative to the flowpath ring, and further showing a cooling air feed channel extending radially into and axially along an outer surface of the hub is in fluid communication with a cooling air passageway formed in the turbine blade so that cooling air can be supplied to the turbine blade from a location radially inward of the flow path ring.

A radially-outwardly facing surface 28 of the conical portion 22 of the hub 12 is formed to include at least one cooling air feed channel 30 as shown in FIG. 4. In the illustrative embodiment, the hub 12 is formed to include a plurality of cooling air feed channels 30 spaced apart circumferentially around the hub 12. The cooling air feed channels 30 extend radially into the conical portion 22 from the radially-outwardly facing surface 28 toward the central axis 11.

The cooling air feed channels 30 extend axially along at least a portion of the radially-outwardly facing surface 28 of the conical portion 22. In some embodiments, the hub 12 comprises nickel superalloy, such as, but not limited to, Udimet 720. In some embodiments, the hub 12 comprises nickel powder alloy, such as, but not limited to, RR1000. In some embodiments, the hub 12 comprises polycrystalline nickel-based superalloy, such as, but not limited to, Mar-M-247. In the illustrative embodiment, the hub 12 is integrally formed as a single component.

The plurality of turbine blades 14 are located radially outward of the hub 12 as shown in FIGS. 1 and 4. The plurality of turbine blades 14 are circumferentially spaced apart from one another about the central axis 11. Notably, the blades may curve around a portion of the axis such that they overlap over certain circumferential locations while remaining spaced apart from one another at any particular location along the axis 11.

Each of the plurality of turbine blades 14 includes a root portion 32 and an airfoil portion 34 extending radially outward from the root portion 32. Once assembled, the root portion 32 of each of the plurality of turbine blades 14 is adjacent the hub 12, and the airfoil portion 34 of each of the plurality of turbine blades 14 extends radially outward into the gas path 18.

The turbine blades 14 are each formed to include a cooling air passageway 36 extending therethrough, as shown in FIGS. 3 and 4. The cooling air passageway 36 is provided to cool the turbine blade 14 that is exposed to the hot working fluid flowing through the gas path 18. In some embodiments, only selected turbine blades 14.

Cooling air is supplied to the turbine blade 14 from the cooling air feed channel 30 formed in the hub 12. Cooling air travels radially outward from the cooling air feed channel 30 into the cooling air passageway 36 of the turbine blade 14. The cooling air feed channel 30 and the cooling air passageway 36 are in fluid communication with one another to carry the cooling air from the hub 12 to the turbine blade 14 as shown in FIG. 4.

In some embodiments, each of the plurality of turbine blades 14 comprise metallic materials. For example, each of the plurality of turbine blades 14 may comprises polycrystalline nickel-based superalloy, such as, but not limited to, Mar-M-247. In some examples, each of the plurality of turbine blades 14 may comprise directionally solidified alloys, such as, but not limited to, CM186LC. In some examples, each of the plurality of turbine blades 14 may comprise single crystal alloys, such as, but not limited to, CMSX-3 or CMSX-4. In some embodiments, each of the plurality of turbine blades 14 may be forged or cast. In some embodiments, each of the plurality of turbine blades 14 may be made through additive manufacturing and may comprise, for example, Haynes 282 alloy. In some embodiments, each of the plurality of turbine blades 14 may be made through additive manufacturing and may comprise a high temperature alloy. In some examples, each of the plurality of turbine blades 14 may be made through metal injection molding and may comprise, for example, Mar-M-247. In some examples, each of the plurality of turbine blades 14 may be made from ceramic matrix composite materials with or without cooling passages. In some embodiments, each of the plurality of turbine blades 14 may be a hybrid bonded turbine blade 14 composed of one or more alloys or materials. In the illustrative embodiment, each of the plurality of turbine blades 14 is integrally formed as a single component.

The flowpath ring 16 extends circumferentially about the central axis 11 as shown in FIG. 1. In the illustrative embodiment, the flowpath ring 16 is integrally formed as a single component. As assembled, the flowpath ring 16 is located radially between the hub 12 and the plurality of turbine blades 14. The flowpath ring 16 is formed to include at least one aperture 38 extending radially through the flowpath ring 16.

In the illustrative embodiment, the flowpath ring 16 is formed to include a plurality of apertures 38. Each aperture 38 is sized to receive a corresponding root portion 32 of the turbine blade 14. In some embodiments, the flowpath ring 16 comprises nickel superalloy, such as, but not limited to, Udimet 720. In some embodiments, the flowpath ring 16 comprises nickel powderalloy, such as, but not limited to, RR1000. In some embodiments, the flowpath ring 16 comprises polycrystalline nickel-based superalloy, such as, but not limited to, Mar-M-247. In some embodiments, the flowpath ring 16 may be 3D printed. In some embodiments, the flowpath ring 16 may be made through additive manufacturing and may comprise a high temperature alloy.

The cooling air feed channel 30 and the cooling air passageway 36 are in fluid communication with one another at the aperture 38. Each aperture 38 includes an inlet opening 40 formed on a radially-inwardly facing surface 42 of the flowpath ring 16 and an outlet opening 44 formed on a radially-outwardly facing surface 46 of the flowpath ring 16 as shown in FIG. 3.

The inlet opening 40 has a first width W1, and the outlet opening 44 has a second width W2 as shown in FIG. 3. The first width W1 is greater than the second width W2 so as to provide for turbine blade 14 retention.

Each of the plurality of turbine blades 14 is inserted into a corresponding aperture 38 as shown in FIG. 3. Each of the plurality of turbine blades 14 is inserted by moving the airfoil portion 34 of the turbine blade 14 through the inlet opening 40 and out the outlet opening 44 (i.e., by locating the turbine blade 14 radially inward of the flowpath ring 16 and moving the turbine blade 14 radially outward through the aperture 38).

After insertion of the turbine blade 14 into the aperture 38, the airfoil portion 34 is located radially outward of the flowpath ring 16, and the root portion 32 is located within the aperture 38. Because the aperture 38 has a decreasing width from the inlet opening 40 to the outlet opening 44, the smaller outlet opening 44, along with the shape of the root portion 32, blocks the turbine blade 14 from moving radially outward entirely out of the aperture 38. The aperture 38 is sized to block radially outward movement of the turbine blade 14 all the way through the aperture 38.

Each turbine blade 14 is fixed to the flowpath ring 16 by a blade joint 48 formed between the root portion 32 of the turbine blade 14 and the flowpath ring 16 as shown in FIG. 4. In some embodiments, the blade joint 48 is a braze joint. In some embodiments, the blade joint 48 is a diffusion bond joint. In some embodiments, the blade joint 48 may be any other joint that fixes the root portion 32 of the turbine blade 14 with the flowpath ring 16. In the illustrative embodiment, a number of the turbine blades 14 included in the radial turbine rotor 10 is equal to a number of apertures 38 formed in the flowpath ring 16.

The flowpath ring 16 allows for inspection of the blade joint 48 using non-destructive inspection methods. This approach can be contrasted with forming a joint between each of the plurality of turbine blades 14 and the hub 12 directly, which can present challenges to inspection. The blade joint 48 may be inspected to determine if the blade joint 48 has been sufficiently formed between each turbine blade 14 and the flowpath ring 16. Various inspection tools may be used to assess the quality of the blade joint 48, such as, but not limited to, an ultrasonic transducer, a magnification device, an eddy current sensor, and/or a flash thermography device.

The flowpath ring 16 includes a cylindrical portion 50 and a conical portion 52 as shown in FIG. 2. The hub 12 fits within the flowpath ring 16 such that the cylindrical portion 20 of the hub 12 is located radially inward of the cylindrical portion 50 of the flowpath ring 16 and the conical portion 22 of the hub 12 is located radially inward of the conical portion 52 of the flowpath ring 16.

As assembled, the hub 12 is located radially inward of the flowpath ring 16 as shown in FIGS. 1 and 4. The radially-outwardly facing surface 28 of the conical portion 22 of the hub 12 and the radially-inwardly facing surface 42 of the conical portion 52 of the flowpath ring 16 have matching contours so that the hub 12 and the flowpath ring 16 may be coupled with each other. The matching surface contours may be achieved through machining of both surfaces 28, 42.

The conical portion 22 of the hub 12 engages the root portion 32 of the turbine blade 14 to block the turbine blade 14 from moving radially inward out of the aperture 38 as shown in FIG. 4. The turbine blade 14 is fixed in place relative to the hub 12 and the flowpath ring 16 because the turbine blade 14 is blocked from radially inward movement by the hub 12 and blocked from radially outward movement by the shape of the aperture 38.

The hub 12 is fixed to the flowpath ring 16 by a hub joint 54 as shown in FIG. 4. The hub joint 54 is formed between the radially-outwardly facing surface 28 of the conical portion 22 of the hub 12 and the radially-inwardly facing surface 42 of the flowpath ring 16. In the illustrative embodiment, the hub joint 54 is a diffusion bond joint. In some embodiments, the hub joint 54 may be any other joint that fixes the hub 12 with the flowpath ring 16. The matching surface contours of the surfaces 28, 42 allow for a strong hub joint 54 to be formed.

In some embodiments, shrink fitting may be used as part of the process of forming the hub joint 54. A material containing a suitable melting point suppressant may be applied to the radially-outwardly facing surface 28 of the hub 12 and/or the radially-inwardly facing surface 42 of the flowpath ring 16. The hub 12 and the flowpath ring 16 may be shrink fit together by sufficiently heating the flowpath ring 16 and cooling the hub 12, resulting in thermal expansion of the flowpath ring 16. After the flowpath ring 16 has expanded, the hub 12 may be inserted into the flowpath ring 16. As the flowpath ring 16 and the hub 12 reach ambient temperature, the hub joint 54 may then be formed through, for example, diffusion bonding.

The hub joint 54 may be inspected to determine if the hub joint 54 has been sufficiently formed between the flowpath ring 16 and the hub 12. Various inspection tools may be used to assess the quality of the hub joint 54, such as, but not limited to, an ultrasonic transducer, a magnification device, an eddy current sensor, and/or a flash thermography device.

Figure 5:
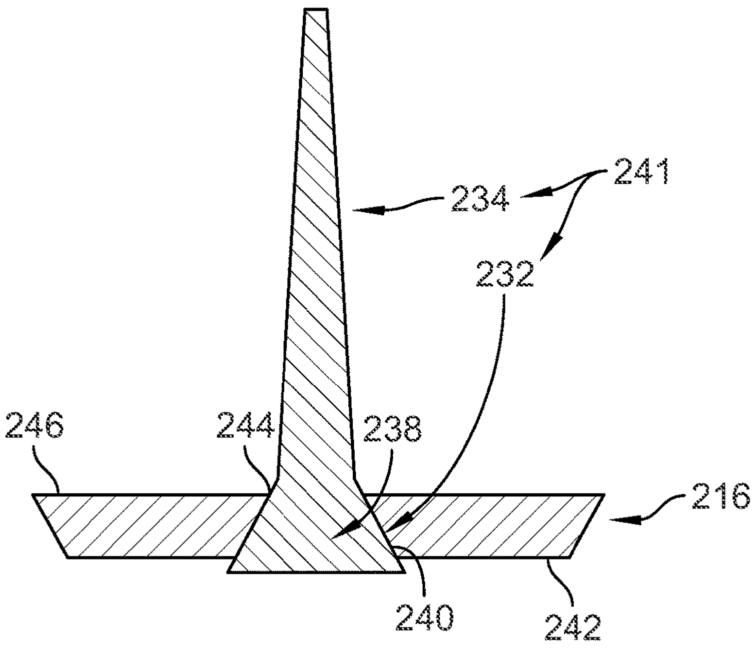
FIG. 5 is a sectional view of a portion of another radial turbine rotor showing a turbine blade comprised of high-temperature material, such as ceramic matrix composite, with the turbine blade inserted in a radially-outwardly extending manner through an associated aperture in the flowpath ring illustrating that a root portion of the turbine blade is sized to block motion of the turbine blade all the way through the aperture.
Figure 6:
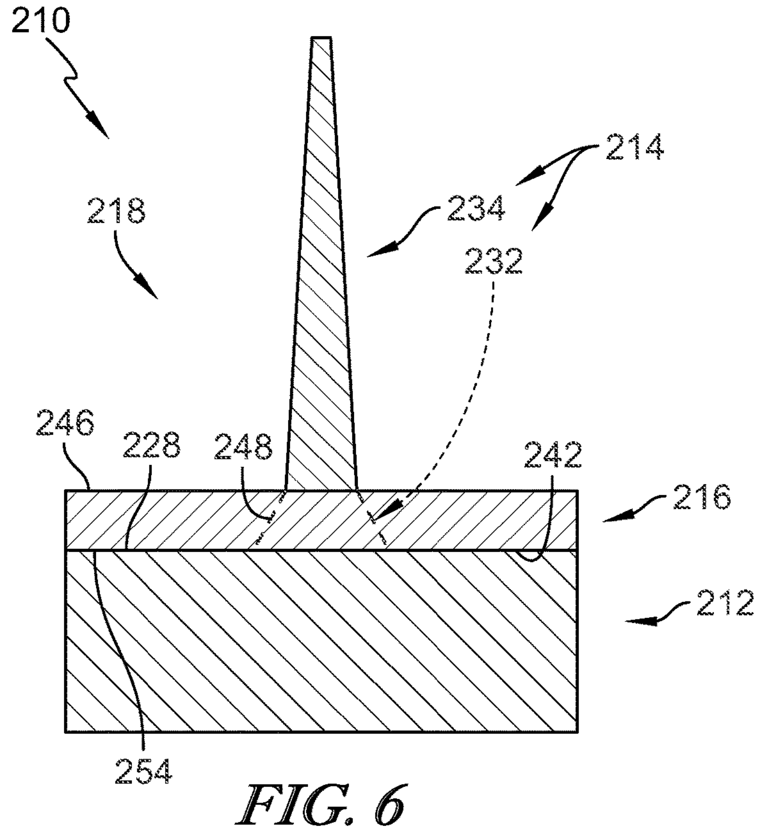
FIG. 6 is a sectional view similar to FIG. 3 showing the hub inserted into the flowpath ring so that the hub blocks radially-inward movement of the turbine blade relative to the flowpath ring.

Another embodiment of a radial turbine rotor 210 in accordance with the present disclosure is shown in FIGS. 5 and 6. The radial turbine rotor 210 is substantially similar to the radial turbine rotor 10 shown in FIGS. 3 and 4 and described herein. Accordingly, similar reference numbers in the 200 series indicate features that are common between the radial turbine rotor 10 and the radial turbine rotor 210. The description of the radial turbine rotor 10 is incorporated by reference to apply to the radial turbine rotor 210, except in instances when it conflicts with the specific description and the drawings of the radial turbine rotor 210.

The radial turbine rotor 210 includes a hub 212, a plurality of turbine blades 214, and a flowpath ring 216 as shown in FIG. 6. The plurality of turbine blades 214 are located radially outward of the hub 212. Each of the plurality of turbine blades 214 includes a root portion 232 and an airfoil portion 234 extending radially outward from the root portion 232. Once assembled, the root portion 232 of each of the plurality of turbine blades 214 is adjacent the hub 212, and the airfoil portion 234 of each of the plurality of turbine blades 214 extends radially outward into a gas path 218.

In some embodiments, the hub 212 comprises nickel superalloy, such as, but not limited to, Udimet 720. In some embodiments, the hub 212 comprises nickel powder alloy, such as, but not limited to, RR1000. In some embodiments, the hub 212 comprises polycrystalline nickel-based superalloy, such as, but not limited to, Mar-M-247. In the illustrative embodiment, the hub 212 is integrally formed as a single component.

In some embodiments, each of the plurality of turbine blades 214 comprises high-temperature material, such as, but not limited to, ceramic, ceramic matrix composite or refractory metals. In some embodiments, each of the plurality of turbine blades 214 comprises a refractory metal, such as niobium based alloys. In the illustrative embodiment, each of the plurality of turbine blades 214 is integrally formed as a single component. Each of the plurality of turbine blades 214 may be forged, cast, metal injection molded, additively manufactured, or made through a composite layup process.

As assembled, the flowpath ring 216 is located radially between the hub 212 and the plurality of turbine blades 214 as shown in FIG. 6. The flowpath ring 216 is formed to include at least one aperture 238 extending radially through the flowpath ring 216. Each aperture 238 is sized to receive a corresponding root portion 232 of the turbine blade 214. In some embodiments, the flowpath ring 216 comprises nickel superalloy, such as, but not limited to, Udimet 720. In some embodiments, the flowpath ring 216 comprises nickel powder alloy, such as, but not limited to, RR1000. In some embodiments, the flowpath ring 216 comprises polycrystalline nickel-based superalloy, such as, but not limited to, Mar-M-247.

Each aperture 238 includes an inlet opening 240 formed on a radially-inwardly facing surface 242 of the flowpath ring 216 and an outlet opening 244 formed on a radially-outwardly facing surface 246 of the flowpath ring 216 as shown in FIG. 5. The inlet opening 240 has a first width, and the outlet opening 244 has a second width. The first width is greater than the second width. Each of the plurality of turbine blades 214 is inserted into a corresponding aperture 238. Each of the plurality of turbine blades 214 is inserted by moving the airfoil portion 234 of the turbine blade 214 through the inlet opening 240 and out the outlet opening 244 (e.g., by locating the turbine blade 214 radially inward of the flowpath ring 216 and moving the turbine blade 214 radially outward through the aperture 238). After insertion of the turbine blade 214 into the aperture 238, the airfoil portion 234 is located radially outward of the flowpath ring 216, and the root portion 232 is located within the aperture 238. Because the aperture 238 has a decreasing width from the inlet opening 240 to the outlet opening 244, the smaller outlet opening 244 blocks the turbine blade 214 from moving radially outward out of the aperture 238. The aperture 238 is sized to block radially outward movement of the turbine blade 214 all the way through the aperture 238.

Each turbine blade 214 is fixed to the flowpath ring 216 by a blade joint 248 between the root portion 232 of the turbine blade 214 and the flowpath ring 216 as shown in FIG. 6. In some embodiments, the blade joint 248 is a braze joint. In some embodiments, the blade joint 248 is a diffusion bond joint. In some embodiments, the blade joint 248 may be any other joint that fixes the root portion 232 of the turbine blade 214 with the flowpath ring 216. In the illustrative embodiment, a number of the turbine blades 214 included in the radial turbine rotor 210 is equal to a number of apertures 238 formed in the flowpath ring 216.

The flowpath ring 216 (as opposed to forming a joint between each of the plurality of turbine blades 214 and the hub 212 directly) allows for inspection of the blade joint 248 using non-destructive inspection methods. The blade joint 248 may be inspected to determine if the blade joint 248 has been sufficiently formed between each turbine blade 214 and the flowpath ring 216. Various inspection tools may be used to assess the quality of the blade joint 248, such as, but not limited to, an ultrasonic transducer, a magnification device, an eddy current sensor, and/or a flash thermography device.

As assembled, the hub 212 is located radially inward of the flowpath ring 216 as shown in FIG. 6. A radially outwardly facing surface 228 of the hub 212 and the radially-inwardly facing surface 242 of the flowpath ring 216 have matching contours so that the hub 212 and the flowpath ring 216 may be coupled together. The matching surface contours may be achieved through machining of both surfaces 228, 242.

The hub 212 engages the root portion 232 of the turbine blade 214 to block the turbine blade 214 from moving radially inward out of the aperture 238 as shown in FIG. 6. The turbine blade 214 is fixed in place relative to the hub 212 and the flowpath ring 216 because the turbine blade 214 is blocked from radially inward movement by the hub 212 and blocked from radially outward movement by the aperture 238.

After each of the plurality of turbine blades 214 is fixed to the flowpath ring 216 via the blade joint 248, the hub 212 is fixed to the flowpath ring 216 by a hub joint 254 as shown in FIG. 6. The hub joint 254 is formed between the radially-outwardly facing surface 228 of the hub 212 and the radially-inwardly facing surface 242 of the flowpath ring 216. In the illustrative embodiment, the hub joint 254 is a diffusion bond joint. In some embodiments, the hub joint 254 may be any other joint that fixes the hub 212 with the flowpath ring 216. The matching surface contours of the surfaces 228, 242 allow for a strong hub joint 254 to be formed.

In some embodiments, shrink fitting may be used as part of the process of forming the hub joint 254. A material containing a suitable melting point suppressant may be applied to the radially-outwardly facing surface 228 of the hub 212 and/or the radially-inwardly facing surface 242 of the flowpath ring 216. The hub 212 and the flowpath ring 216 may be shrink fit together by sufficiently heating the flowpath ring 216 and cooling the hub 212, resulting in thermal expansion of the flowpath ring 216. After the flowpath ring 216 has expanded, the hub 212 may be inserted into the flowpath ring 216. As the flowpath ring 216 and the hub 212 reach ambient temperature, the hub joint 254 may then be formed through, for example, diffusion bonding.

The hub joint 254 may be inspected to determine if the hub joint 254 has been sufficiently formed between the flowpath ring 216 and the hub 212. Various inspection tools may be used to assess the quality of the hub joint 254, such as, but not limited to, an ultrasonic transducer, a magnification device, an eddy current sensor, and/or a flash thermography device.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A radial turbine rotor, the rotor comprising:

a hub arranged around a central axis that defines a radially-innermost surface of the rotor, a plurality of turbine blades comprising metallic materials and located circumferentially outward of the hub, each of the turbine blades shaped to include a root portion adjacent to the hub and an airfoil portion spaced radially outward of the hub, and a flowpath ring formed to include a plurality of apertures that each receive the root portion of an associated one of the plurality of turbine blades and that each are sized to block radially outward movement of the associated one of the plurality of turbine blades, wherein the flowpath ring is coupled radially outward of the hub to the hub and the hub is sized to block radially inward movement of the plurality of turbine blades relative to the flowpath ring so that the plurality of turbine blades are fixed in place relative to the hub and the flowpath ring, wherein at least one of the plurality of turbine blades is formed to include a cooling air passageway therein and the hub is formed to include at least one cooling air feed channel that extends radially inwardly into the hub from a radially-outwardly facing surface of the hub, the at least one cooling air feed channel is in fluid communication with the cooling air passageway, wherein the at least one cooling air feed channel formed in the hub does not extend entirely radially through the hub.

2. The rotor of claim 1, wherein each of the plurality of turbine blades are fixed to the flowpath ring by a blade joint formed between the root portion of each of the plurality of turbine blades and the flowpath ring.

3. The rotor of claim 2, wherein the blade joint is a braze joint.

4. The rotor of claim 1, wherein the hub is fixed to the flowpath ring by a hub joint formed between the radially-outwardly facing surface of the hub and a radially-inwardly facing surface of the flowpath ring.

5. The rotor of claim 4, wherein the hub joint is a diffusion bond joint.

6. The rotor of claim 1, wherein the at least one cooling air feed channel formed in the hub is configured to carry cooling air from a location radially inward of the plurality of turbine blades.

7. The rotor of claim 1, wherein the at least one cooling air feed channel is in fluid communication with the cooling air passageway at one of the plurality of apertures that each receive the root portion of an associated one of the plurality of turbine blades.

8. The rotor of claim 7, wherein the cooling air feed channel extends radially inward from the radially-outwardly facing surface of the hub toward the central axis and axially along the radially-outwardly facing surface.

9. A radial turbine rotor, the rotor comprising:

a hub arranged around a central axis, a turbine blade located radially outward of the hub and extending into a gas path, the turbine blade shaped to include a root portion and an airfoil portion extending outwardly from the root portion into the gas path, and a flowpath ring formed to include a plurality of apertures extending radially through the flowpath ring, the root portion of the turbine blade is received by one of the plurality of apertures, and the flowpath ring is coupled radially outward of the hub, wherein each of the plurality of apertures has an inlet opening formed on a radially-inwardly facing surface of the flowpath ring and an outlet opening formed on a radially-outwardly facing surface of the flowpath ring, the inlet opening has a first width and the outlet opening has a second width, and the first width is greater than the second width so that radially outward movement of the turbine blade received by the one of the plurality of apertures is blocked by the one of the plurality of apertures and radially inward movement of the turbine blade is blocked by the hub, wherein the turbine blade is formed to include a cooling air passageway therein and the hub is formed to include a cooling air feed channel that extends radially inwardly into the hub from a radially-outwardly facing surface of the hub, the cooling air feed channel is in fluid communication with the cooling air passageway, wherein a radially innermost surface of the cooling air feed channel formed in the hub is located radially outward of a radially-inwardly facing surface of the hub.

10. The rotor of claim 9, wherein the turbine blade is fixed to the flowpath ring by a blade joint formed between the root portion of the turbine blade and the flowpath ring.

11. The rotor of claim 10, wherein the blade joint is a braze joint.

12. The rotor of claim 9, wherein the hub is fixed to the flowpath ring by a hub joint formed between the radially-outwardly facing surface of the hub and the radially-inwardly facing surface of the flowpath ring.

13. The rotor of claim 12, wherein the hub joint is a diffusion bond joint.

14. The rotor of claim 9, wherein the cooling air feed channel is configured to carry cooling air from a location radially inward of the turbine blade.

15. The rotor of claim 14, wherein the cooling air feed channel is in fluid communication with the cooling air passageway at the one of the plurality of apertures that receive the root portion of the turbine blade.

16. The rotor of claim 9, wherein the cooling air feed channel extends radially inward from the radially-outwardly facing surface of the hub toward the central axis and axially along the radially-outwardly facing surface.

17. The rotor of claim 9, wherein the turbine blade comprises ceramic matrix composite materials.

18. The rotor of claim 9, wherein the cooling air feed channel formed in the hub does not extend entirely radially between the radially-outwardly facing surface of the hub and a radially-inwardly facing surface of the hub opposite the radially-outwardly facing surface.

19. The rotor of claim 9, wherein the turbine blade is formed through additive manufacturing.

20. The rotor of claim 9, wherein the flowpath ring is formed through additive manufacturing.

* * * * *